Figure 1:
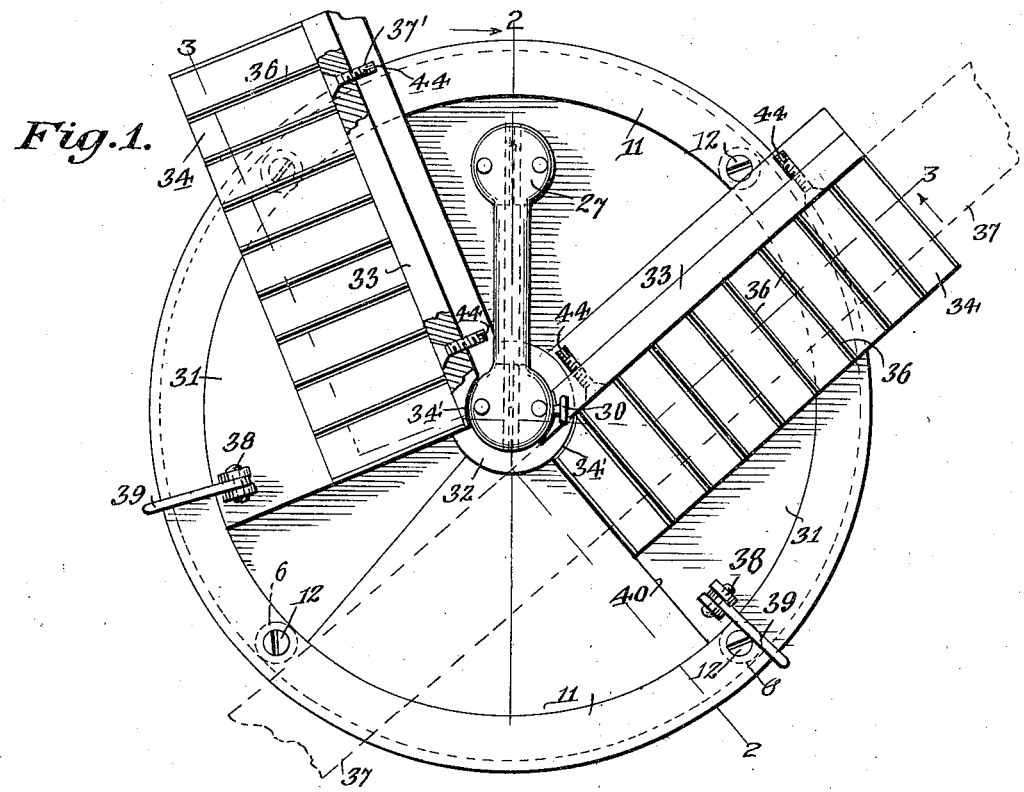

Aug. 21, 1923.

W. C. AYRES 1,465,800

MITER BOX

Filed Nov. 17, 1922

2 Sheets-Sheet 1

INVENTOR.
William C. Ayres,
BY
Geo. F. Kimmel ATTORNEY.

Aug. 21, 1923.
W. C. AYRES
MITER BOX
Filed Nov. 17, 1922
1,465,800
2 Sheets-Sheet 2
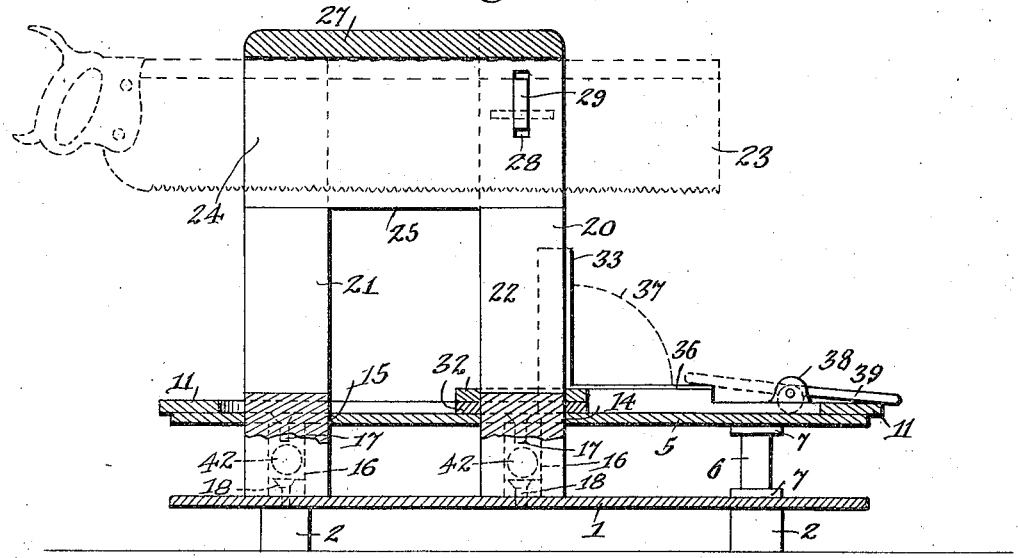
Fig. 2.
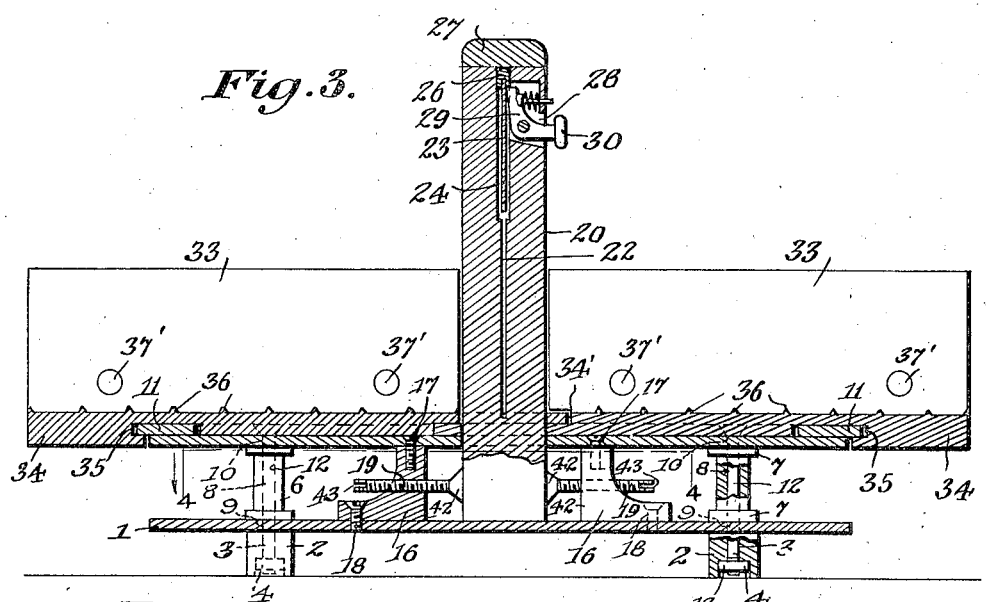
Fig. 3.
Fig. 6.
William C. Ayres, INVENTOR.
BY
Geo. F. Kimmel, ATTORNEY.

Patented Aug. 21, 1923.

1,465,800

UNITED STATES PATENT OFFICE.

WILLIAM C. AYRES, OF PONTIAC, MICHIGAN.

MITER BOX.

Application filed November 17, 1922. Serial No. 601,512.

*To all whom it may concern:*

Be it known that I, WILLIAM C. AYRES, a citizen of the United States, residing at Pontiac, in the county of Oakland and State of Michigan, have invented certain new and useful Improvements in Miter Boxes, of which the following is a specification.

This invention relates to miter boxes, and has for its object to provide in the manner as hereinafter set forth, a box of such class with means arranged to permit of cutting the wood or other material at any desired angle without changing the position of the saw in the saw guide.

A further object of the invention is to provide in a manner as hereinafter set forth, a box of such class with a saw guide carrying means for suspendingly supporting the saw when not in use.

A further object of the invention is to provide in a manner as hereinafter set forth, a miter box of such class including a supporting table, a stationary saw guide mounted in said table, and a pair of adjustable work supports pivotally connected to the saw guide and having their outer edges guided during the adjustment thereof by the supporting table.

A further object of the invention is to provide in a manner as hereinafter set forth, a miter box including a stationary supporting table having arranged thereon and projecting therefrom a pair of adjustable work supports carrying means engaging with the table for maintaining the supports in a position to which they have been adjusted.

A further object of the invention is to provide in a manner as hereinafter set forth, a miter box including a series of elements consisting of a supporting base, a supporting table, a saw guide and a pair of adjustable work supports, and means whereby said elements can be assembled in and disassembled from operative relation with respect to each other when occasion so requires.

Further objects of the invention are to provide a miter box which is simple in its construction and arrangement, strong, durable, compact, efficient and convenient in its use, readily set up and knocked down when occasion so requires, and comparatively inexpensive to manufacture.

With the foregoing and other objects in view the invention consists of the novel construction, arrangement and combination of parts as hereinafter more specifically described, and illustrated in the accompanying drawings, wherein there is shown an embodiment of the invention, but it is to be understood that changes, variations and modifications can be resorted to, which fall within the scope of the claims hereunto appended.

In the drawings wherein like reference characters denote corresponding parts throughout the several views:—

Figure 1 is a top plan view, partly broken away, of a miter box in accordance with this invention.

Figure 4:
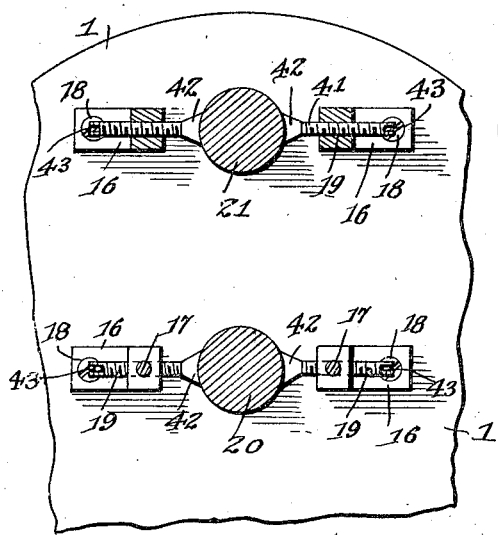
Figure 5:
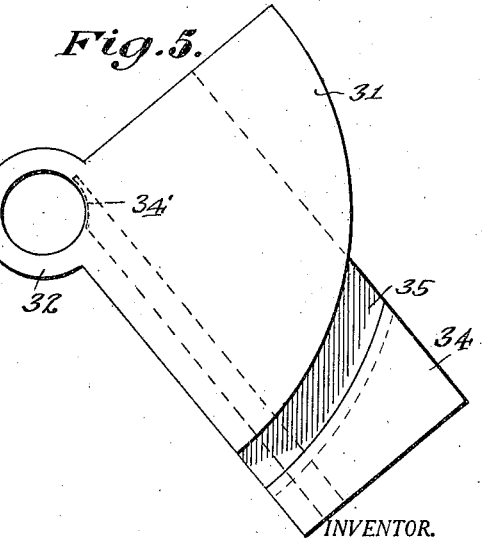

Fig. 2 is a section on line 2—2 of Fig. 1.
Fig. 3 is a section on line 3—3 of Fig. 1.
Fig. 4 is a section on line 4—4 of Fig. 3.
Fig. 5 is an inverted plan view of one of the adjustable work supports.
Fig. 6 is a cross sectional view of one of the adjustable work supports.

Referring to the drawings in detail, 1 denotes a stationary base which is circular in contour, and which is mounted on a series of vertically extending short supports 2. Each of the supports 2, is formed with a vertically disposed central bore 3, and also at the lower end thereof with a counterbore 4. Arranged above and spaced from the base 1, is a stationary platform 5, which is circular in contour and is substantially the same diameter as the diameter of the base 1. Interposed between the platform 5 and the base 1, is a series of vertically disposed supporting standards 6, each provided at its upper and lower ends with a flange 7. Each of the standards 6 is formed with a vertically disposed bore 8 which registers with the bore 3 in a support 2. The standards 6 are arranged in alinement with the supports 2, and the bores 8 of the standards 6, register with openings 9 formed in the base 1, and with openings 10 formed in the platform 5.

Mounted on the upper face of the platform 5, at the marginal portion thereof, as well as projecting outwardly from the platform 5, is a flat annular guide member 11.

The guide member 11, platform 5, standards 6, base 1, and supports 2, are secured together by vertically disposed coupling bolts 12. Each of the bolts 12 extends through the guide member 11, an opening 10, a standard 6, an opening 9, and through a support 2. The lower end of each of the bolts 12 extend into the counterbore 4, and carries a nut 13, and as the bolt 12 is provided at its other end with a head 12, seated in the guide 11, the nut 13 in connection with the head of the bolt securely clamps together the guide 11, platform 5, standard 6, base 1, and supports 2. By this arrangement, however, the guide 11, platform 5, standards 6, base 1, and supports 2 are detachably connected together, so these various elements can be assembled and disassembled when occasion so requires.

The platform 5 at its axis is formed with an opening 14, and is furthermore provided in diametrical alinement with the opening 14, with an opening 15 arranged in proximity to the guide 11. Interposed between the platform 5 and the base 1, on each side of each of the openings 14 and 15, is a pair of oppositely disposed brace members 16, each of which is secured by the hold fast device 17, to the platform or table 5, and by the hold fast device 18, to the base 1. Each of the brace members 16, is formed with a transversely extending opening 19, which is disposed in parallelism with respect to the base 1, and has the wall thereof threaded.

Mounted on the base 1, and projecting up through the platform or table 5, is a saw guide, and which consists of a pair of vertically disposed posts 20, 21, arranged in alinement with each other, and so disposed that the post 20 extends up through the opening 14 and the post 21 extends up through the opening 15. The post 20, as well as the post 21, is formed with a guide passage 22, for the saw 23. The guide passages 22 of the posts are arranged in alinement, and the upper portion of the guide passage 22, in each post, is of greater width than the lower portion, as indicated at 24. The upper portion of the post 20, is connected to the upper portion of the post 21, by plates 25, and which are arranged in spaced relation in such a manner, so as to form a continuation of the upper portion 24 of the guide passage 22. The width of the upper portion 24, of the guide passage 22, is slightly greater than the thickness of the saw back 26. Mounted on and secured to the top of the posts 20, 21, is a closure member 27.

The post 20 at one side, near its upper end, is formed with an opening or pocket 28, in which is mounted a spring controlled pivoted latch 29, adapted to engage the saw back 26, for maintaining the saw 23 in an elevated position, when the saw is not in use. A finger or thumb piece 30 is provided on the outer end of the latching element 29, to provide for the convenient shifting of said element on its pivot, to release it from engagement with the saw back 26.

Mounted for angular adjustment on the platform or table 5, is a pair of shiftable work supports, which extend in opposite directions with respect to each other, and each of which comprises a quadrant-shaped body portion 31, formed at its inner end, with an annular collar 32, through which extends the post 21, and by this arrangement, the work holders are pivotally connected to the post 20. The collar 32 of one work holder, is offset with respect to the collar 32 of the other work support or holder, so that when the work supports are connected with the post 21, the collars 32 will be arranged in overlapping position, as clearly shown in Fig. 3 of the drawings. The curved edge of each of the body portions 31, slides against the inner edge of the annular guide 11. Formed integral with and projecting from the body portion 31, is an L-shaped supporting member 33, which projects beyond the guide 11, and is formed with a depending portion 34, which is mortised as at 35, to overlap the guide 11. The support 33 of one work holder or support, is cut away at its inner end as at 34', so as to overlap a collar 32, as clearly shown in Fig. 3.

The horizontal leg of the support 33, has its upper face provided with transverse ribs 36, upon which is mounted the work 37. The vertical leg of the support 33, carries a plurality of adjusting members 37', which have threaded engagement with said vertical legs, and are employed for adjusting the position of the work 37, as shown in Fig. 6.

Each of the body portions 31, of the work holders or supports, has pivotally connected therewith, as at 38, a cam lever 39, capable of engaging with the upper face of the platform or table 5, for the purpose of maintaining the work holder in the position to which it has been adjusted. When the cam levers 39 are shifted to the position shown in full lines in Fig. 2, the work holders are locked to the platform or table 5, but when moved to the position shown in dotted lines in Fig. 2, the work holders can be angularly adjusted to the desired position.

Suitable indicia, by way of example, radially disposed lines 40 are provided on the upper face of the platform or table 5, to indicate various adjustments with respect to the work holders.

The saw guide is maintained in vertical position, through the medium of a series of clamping elements 41, which have threaded engagement with the brace members 16, and are provided with curved heads 42, which abut against the lower terminal portions of the posts 20 and 21, as clearly shown in Fig. 4.

The outer ends of the elements 41, are slotted, as at 43, to provide for the convenient adjustment of the said elements 41, and the outer ends of the elements 37', are slotted as at 44, to provide for the convenient adjustment thereof.

From the foregoing description, taken in connection with the accompanying drawings, a miter box is set up, which provides for accurate cutting of the work, is of wide capacity, readily operated, easily repaired, portable and adapted for use in connection with a thin backed, fine toothed hand saw employed by carpenters, and although the preferred construction is as illustrated, yet it is to be understood that changes in the details of construction can be had without departing from the spirit of the invention as claimed.

What is claimed is:—

1. A miter box comprising a stationary table, a guide member projecting therefrom, a saw guide projecting upwardly from said table, a pair of angularly adjustable work holders each including a support projecting from the table, and a quadrant-shaped body portion depending from said support and pivotally connected with the saw guide and interposed between the latter and said guide member which conforms to the curve of the quadrant-shaped portions.

2. A miter box comprising a stationary table, a guide member projecting therefrom, a saw guide projecting upwardly from said table, a pair of angularly adjustable work holders each including a support projecting from the table, a quadrant-shaped body portion depending from said support and pivotally connected with the saw guide and interposed between the latter and said guide member which conforms to the curve of the quadrant-shaped portions, and means carried by each of said body portions and engageable with the table for locking a work holder in its adjusted position.

3. A miter box comprising a stationary table, a guide member projecting therefrom, a saw guide projecting upwardly from said table, a pair of angularly adjustable work holders each including a support projecting from the table, a quadrant-shaped body portion depending from said support and pivotally connected with the saw guide and interposed between the latter and said guide member which conforms to the curve of the quadrant-shaped portions, a base supporting said table and saw guide, and clamping means for said saw guide carried by the base.

4. A miter box comprising a stationary table, a guide member projecting therefrom, a saw guide projecting upwardly from said table, a pair of angularly adjustable work holders each including a support projecting from the table, a quadrant-shaped body portion depending from said support and pivotally connected with the saw guide and interposed between the latter and said guide member which conforms to the curve of the quadrant-shaped portions, means carried by each of said body portions and engageable with the table for locking a work holder in its adjusted position, a base supporting said table and saw guide, and clamping means for the saw guide carried by the base.

5. A miter box comprising a stationary table, a saw guide projecting upward therefrom, a guide member projecting through the table, a pair of angularly adjustable work holders extended between said member and saw guide and further projecting beyond said table and overlapping said member, said holders pivotally connected to said saw guide, a base supporting said table and saw guide, and clamping means for said saw guide carried by the base.

6. A miter box comprising a base, supports therefor, standards mounted on the base, a table positioned on the said standards, a guide member carried by the table, means extending through said supports, base, standards, table and member for detachably connecting them together, a saw guide detachably clamped with said base, extending up through said table, and angularly adjustable work holders mounted on the table and pivotally connected to said saw guide.

7. A miter box comprising a base, supports therefor, standards mounted on the base, a table positioned on the said standards, a guide member carried by the table, means extending through said supports, base, standards, table and member for detachably connecting them together, a saw guide detachably clamped with said base, extending up through said table, angularly adjustable work holders mounted on the table and pivotally connected to said saw guide, and means carried by each of said work holders and engageable with the table for locking a work holder in adjusted position.

8. A miter box comprising a table, a saw guide projecting therethrough and including a pair of posts each provided with a guide passage, said passages alining, a pair of angularly adjustable work holders mounted on the table and pivotally connected to one of said posts, and supporting means for said saw guide, said means provided with clamping elements engaging with said posts.

In testimony whereof, I affix my signature hereto.

WILLIAM C. AYRES.